(12) United States Patent
Rowley

(10) Patent No.: US 6,783,160 B2
(45) Date of Patent: *Aug. 31, 2004

(54) PLASTIC-LINED METAL-ENCASED TUBING SEGMENT CONNECTOR SYSTEM

(75) Inventor: William W. Rowley, Chagrin Falls, OH (US)

(73) Assignee: Mercury Plastics, Inc., Middlefield, OH (US)

( * ) Notice: Subject to any disclaimer, the term of this patent is extended or adjusted under 35 U.S.C. 154(b) by 39 days.

This patent is subject to a terminal disclaimer.

(21) Appl. No.: 10/286,555

(22) Filed: Nov. 1, 2002

(65) Prior Publication Data

US 2004/0090064 A1 May 13, 2004

(51) Int. Cl.[7] .............................................. F16L 49/00
(52) U.S. Cl. .................... 285/242; 285/55; 285/148.16; 285/148.18; 285/148.23; 285/222.5; 285/256; 285/382.7; 285/397
(58) Field of Search .................. 285/50, 55, 132.1, 285/133.11, 148.22, 148.23, 222.5, 148.17, 242, 397, 398, 382.1, 382.2, 370, 256, 179

(56) References Cited

U.S. PATENT DOCUMENTS

| | | | | |
|---|---|---|---|---|
| 2,724,672 A | * | 11/1955 | Rubin | 285/55 |
| 3,378,282 A | * | 4/1968 | Demler | 285/148.13 |
| 3,521,913 A | * | 7/1970 | Verhein et al. | 285/109 |
| 4,541,042 A | * | 9/1985 | Kohashi | 347/172 |
| 4,726,612 A | * | 2/1988 | Picton | 285/256 |
| 4,962,958 A | * | 10/1990 | Takei | 285/55 |
| 5,333,913 A | * | 8/1994 | Stallard, III | 285/48 |
| 6,095,571 A | | 8/2000 | MacDuff | |
| 6,270,125 B1 | * | 8/2001 | Rowley et al. | 285/242 |
| 6,299,071 B1 | | 10/2001 | Fiedrich | |
| 6,441,096 B1 | * | 8/2002 | Backman et al. | 525/240 |
| 2002/0111419 A1 | | 8/2002 | Chiang et al. | |

OTHER PUBLICATIONS

Viega Literature, 32 pages, undated.
Noveon FlowGuard Gold Literature, 6 pages, undated.
KITEC Composite Pipe & Fittings System Literature, 68 pages, undated.

* cited by examiner

Primary Examiner—Lynne H. Browne
Assistant Examiner—Aaron Dunwoody
(74) Attorney, Agent, or Firm—Buckingham, Doolittle & Burroughs, LLP; Louis F. Wagner

(57) ABSTRACT

The invention relates generally to a solderless metallic-encased, polymeric-lined connector system.

97 Claims, 7 Drawing Sheets

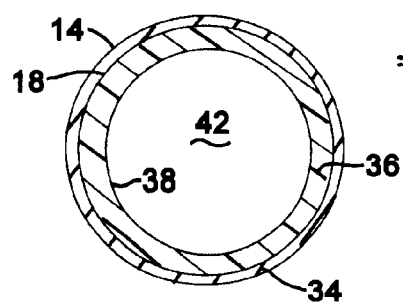
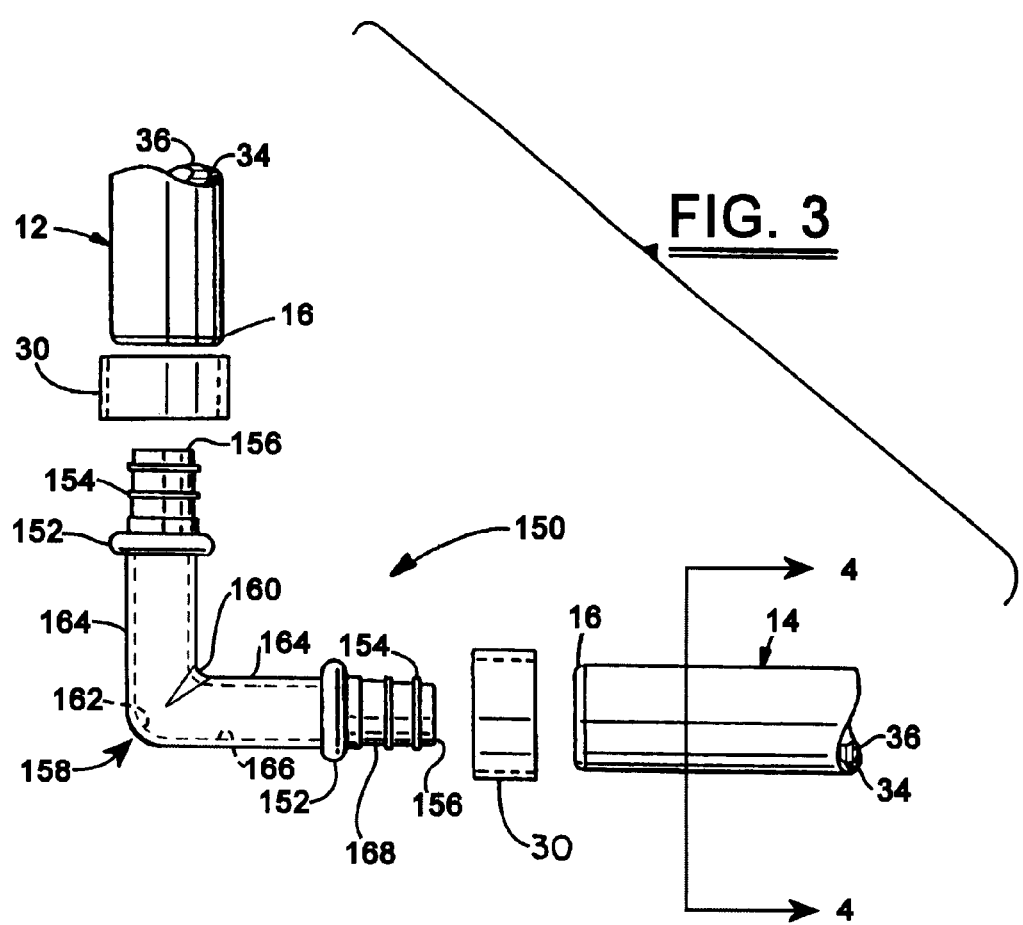

PLASTIC-LINED METAL-ENCASED TUBING SEGMENT CONNECTOR SYSTEM

TECHNICAL FIELD

The invention relates generally to a polymeric-lined, metal-encased tubing segment connector system which eliminates the need for soldering in order to connect the tubing segments.

BACKGROUND OF THE INVENTION

In any environment, the need exists to be able to connect fluid conduits and pipes of different diameters as well as tubing and pipe fittings having different configurations and geometries. While this is not a problem for an experienced plumber with a working knowledge of standardized pipe and tubing sizes and fittings, the challenge is more difficult for the homeowner or the do-it-yourselfer. Additionally, while the experienced plumber is familiar with the art of soldering copper pipe together in order to achieve a leak-proof connection, this skill is often lacking with many homeowners or do-it-yourselfers.

One alternative to copper tubing is rigid plastic tubing (e.g., polyvinyl chloride or PVC), which is often used in water drain lines. PVC adhesives are typically used to glue the tubing segments to tubing connectors. It is also possible to connect polymeric tubing by substituting flexible PVC and using a crimp ring to compress the tubing ends deformably down against a rigid insert positioned in the internal conduit in the tubes. This use of crimp rings is particularly well known in association with elastomeric hose or tubing, where the material possesses sufficient elasticity to be deformed without breaking. When a connector having a permanently formed feature in the internal conduit (such as a bend, reducer or intersection) has been required, the prior art has made these connectors out of metal, especially brass or copper, or a rigid polymeric material, especially a thermoplastic. Therefore, connectors may be shaped into an "L", "T" "Y", "X", reducing or enlarging connectors of the above defined or other shapes, inclusive of other shapes required of connectors in everyday tubing applications.

Therefore, what has been lacking in the industry is a fluid connector system which capitalizes on the ease of installation and connection of lengths of polymeric tubing using crimp rings but which sags excessively, with the professional look of copper without the need for soldering copper connectors. The system of the instant invention capitalizes on the best elements of both systems, namely the professional look of copper installations with the ease of connection of polymers using crimp rings. This is an advantage provided by the present invention.

SUMMARY OF THE INVENTION

The invention is directed to a polymeric-lined metal-encased, preferably copper, tube segment connector system which eliminates the need for copper soldering to effect the leak-proof engagement between tubing segments. In one embodiment, the connector comprises a central portion with an internal conduit having a permanently formed feature therein, and a plurality of arms. Each of the arms extends from the central portion and terminates in an arm end, such that there is one arm and arm end paired with each of the tube ends, with the connector internal conduit extending through the arms to the respective arm ends. A first nipple portion of each linear insert has an external surface frictionally engaged in an internal surface of the connector internal conduit at the arm end. A second nipple portion of each linear insert has an external surface frictionally engaged in an internal surface of the polymeric-lined tube internal conduit at the tube end. The plurality of ring members are such that one ring member is slidingly received along each tube end or arm end atop one of the linear inserts frictionally engaged therein, the ring member compressively deforming the respective tube end or arm end onto the linear insert, joining the connector internal conduit to the tube internal conduit in a leak-free manner.

In a second embodiment, the linear insert and connector are of unitary construction, each connector having a protruding nipple portion with an external surface frictionally engaged in an internal surface of the polymeric-lined tube internal conduit at the tube end. The plurality of ring members are such that one ring member is slidingly received along each tube end or arm end atop one of the protruding nipples frictionally engaged therein, the ring member compressively deforming the respective tube end or arm end onto the nipple, joining the connector internal to the tube internal conduit in a leak-free manner. In an alternative embodiment, when the connector nipples are sufficiently long, it is possible to effect the crimp sealing of the connector and tubing without the need for crimp rings, which are then optional.

In one principal aspect of the present invention, the invention capitalizes on the flexibility of plastics and polymers to effect the sealing engagement with a metal or thermoset connector with the rigidity of copper tubing.

In another principal aspect of the present invention to eliminate the inherent "sagging" of an all-plastic connector system.

Accordingly, it is an object of the present invention to eliminate the need for soldering when connecting lengths of copper tubing.

It is another object of the present invention to provide a system which uses the inherent flexibility of thermoplastics and some thermosets with the rigidity of copper tubing.

It is still another object of the present invention to provide a system which facilitates the fabrication of manifold connections which are now less labor-intensive and form the basis of a cross-over product which combines the best features of metal and polymers.

These and other advantages of the present invention are provided by the present invention, which comprises a tubing assembly, comprising at least two polymer-lined metal tubes, a metal tubing connector, and a plurality of crimp ring members. Each polymeric-lined tube has a tube end and an internal conduit. A connector, typically metal, is for joining the at least two tubes.

In the preferred embodiments, the permanently formed feature of the connector is selected from the group consisting of an angular diversion, an intersecting conduit, a smooth reduction of the internal and external diameters, and any combination thereof.

In the preferred embodiments, the connector is metal, preferably copper.

In some embodiments, the connector will have two arms. In other embodiments, it will have three arms, especially arranged in a "T" shape or a "Y" shape. In other embodiments, the connector has four or more arms.

In some embodiments, at least one of the at least two tubes is an arm of a further connector.

In some embodiments, the connector is a linear reducer. In other embodiments, the connector is a reducing elbow.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 3 shows an alternative embodiment of a tubing assembly of the present invention using a one-piece multi-ribbed metallic connector;

FIG. 4 shows an enlarged cross-sectional view of one polymeric-lined metal-encased tubing segment taken along line 4—4 of FIG. 3;

DETAILED DESCRIPTION OF THE INVENTION

Figure 1:
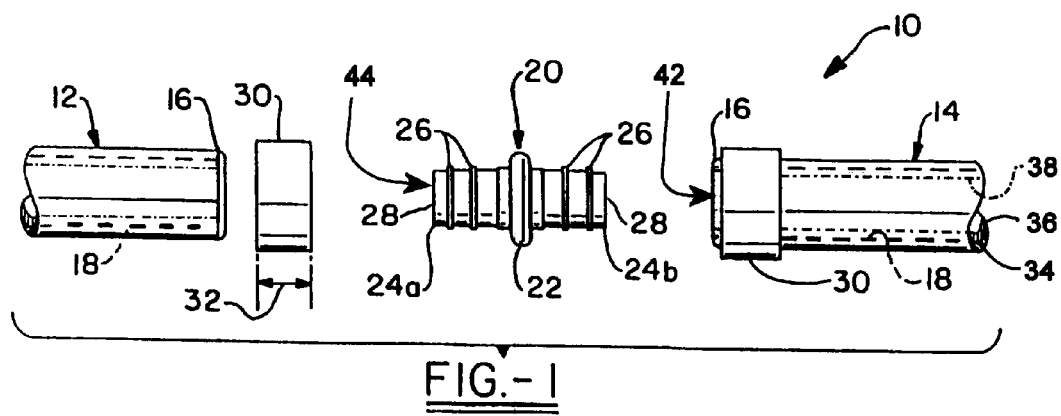
FIG. 1 shows an exploded view of a polymeric-lined tubing assembly being connected using a linear multi-ribbed metal connector.

Referring now to the drawings wherein the showings are for purposes of illustrating the preferred embodiment of the invention only and not for purposes of limiting the same, FIG. 1 shows two segments of a metal-encased polymeric-lined tubing assembly 10 which is in leak-proof fluid communication with a linear connector 20. The assembly 10 comprises first and second essentially straight tubes 12,14, each of which has at least one tube end 16, which provides access to an internal conduit 42 in each tube 12,14. Each tube 12,14 is comprised of two components: a metal exterior 34 having an internal diameter 18; and a polymer tube 36 centrally disposed therein having an internal diameter 38. In the most common cases, the internal conduit 42 defined by internal diameter 38 will be smooth and otherwise unremarkable. For each of the tubes 12,14, there will be an inner and outer diameter, an outer diameter of the polymeric tube 36 being essentially equal to the internal diameter of metal tube 34. The differences between the inner and outer diameters of the polymer and metal tubes representing a wall thickness for each tube.

An insert 20 shown in its linear configuration in FIG. 1, is used to connect the tube ends 16 of tubes 12,14. The particular insert 20 shown in FIG. 1 has a central bulbous portion 22, with identical first and second nipple portions 24a, 24b extending away from the bulbous portion. Other inserts 20, not shown, would have one nipple portion 24 with a larger diameter than the other or have the two nipple portions 24 aligned at an angle to each other as better illustrated in FIGS. 2, 3 and 5. The exterior surface of the nipple portions 24a, 24b will generally be provided with at least one circumferential rib 26 of slightly larger diameter and the distal end 28 of each nipple portion will generally have a collar 40 of even a slightly larger diameter, said collar illustrated only in FIG. 2. The interior surface 44 of the insert 20 is generally smooth and otherwise unremarkable. The nipple portion 24a or 24b may be inserted into the tube end 16 in a slight interference fit due to the external diameter of the ribs 26 and optional collar 40. This slight interference fit will retain the insert 20 loosely in the tube end 16, although it may be removed easily if desired. The central bulbous portion 22, has a larger external diameter than the internal diameter of the tubes 12,14 at tube end 16, and provides a stop when it abuts against the tube end 16.

Figure 2:
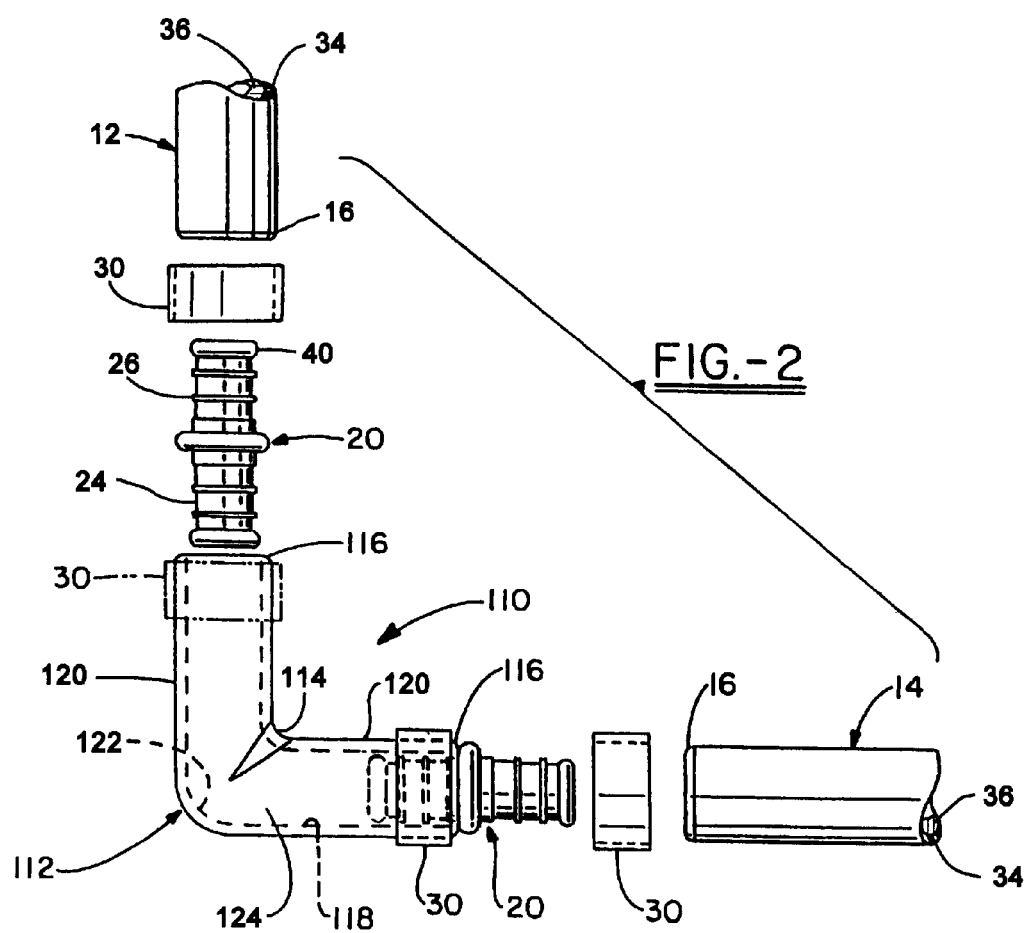
FIG. 2 shows an exploded view of a tubing assembly of the present invention using two multi-ribbed connectors of FIG. 1.

FIG. 2 shows the present invention and is illustrative of this concept where it shows insert 20 inserted into 90° connector 112 at connector end 116. A crimp ring 30 for a particular fitting is characterized by two specific dimensions. An internal diameter of the ring 30 is sufficiently larger than the external diameter of the tubes 12,14 so that the ring will generally slide freely along the length of the tube. The ring 30 will have a external diameter effectively defined by the desired wall thickness and the internal diameter. The ring 30 will have an axial length 32 long enough to provide an ample surface for applying a crimping tool, but preferably not longer than a distance between the central bulbous portion 22 and the distal end 28 or optional collar 40 on the insert 20. This fit is illustrated in FIGS. 1 and 2, where a present invention connector end 116 is involved. When the ring 30 and insert 20 are properly positioned on a tube end 16 and the internal diameter of the ring is reduced by deformation from a crimping tool or the like, the ring, the tube end 16 is compressively deformed onto the nipple portion 24, effectively securing the proximal end 28 or optional collar 40 within the tube end 16 with leakproof engagement effected by intimate surface contact of the interior surfaces of polymeric tube 36 with the exterior surface of one nipple 24 of the linear connector 20.

When properly assembled, a slight amount (approximately ⅛ inch) of the tube end 16 beyond the ring 30 is exposed, as is generally shown on tube end 16 of tube 14 in FIG. 1. A properly assembled crimp ring/tube/fitting assembly will withstand considerable internal pressure and provides an attractive method of attaching tubing pieces together. Both the crimp ring 30 and the insert 20 will be preferably formed from a metal such as copper or brass, although it is possible to use a rigid plastic material, especially a thermoplastic, for the insert and it is known in the art to use a crimp ring 30 which is polymeric. In this latter case, the crimp ring 30 has a normal or relaxed internal diameter which is smaller than the external diameter of the tube end 16. Such a polymeric ring 30 can have its internal diameter temporarily expanded with an expander tool and the ring can be placed on the tube end 16 while in this expanded state. As the polymer relaxes back to its smaller internal diameter, the compressive force exerted on the tube end 16 deforms the tube end onto the corresponding nipple portion 24.

From the foregoing description, it will be understood that the same tube joining technique shown at tubes ends 16 of tubes 12,14 could be performed at a second end of either one of the tubes 12,14, in which case a short straight length of the tube connected at each end to the other tubes would effectively define a connector having arm ends where ring members 30 would compressively deform the arm ends onto the insert 20, joining an internal conduit 44 in the connector to the internal conduit 42 in the tubes in a leak-free manner. However, the invention is not limited to linear connectors, but is also applicable to connectors possessing a permanently formed feature, such as an angular diversion of the connector internal conduit, an intersection or a reduction of diameter, while retaining the ability to join the connector to the tubes in a leak-free manner by compressively deforming the arm ends of the connector onto an insert 20.

In FIG. 2, the angularity discussed previously is illustrated showing one embodiment of a tubing assembly 110 of the present invention. In a preferred embodiment, crosslinkable polyethylene, commonly referred to as "PEX", is a preferred material, but other materials possessing the required properties may allow practice of the present invention. For example, it may be possible to obtain the inventive effect with polypropylene, commonly referred to as "PP". PEX may be extruded into tubes while in an uncrosslinked condition, during which it acts as a thermoplastic. The extruded tube may be formed into shapes and then crosslinked, using a variety of known crosslinking techniques, to permanently set the shapes into the PEX tube, which retains a sufficient amount of elasticity to be deformably compressed between a crimp ring and an insert to provide a leak-free seal. The PEX material may also be injection molded from a melt in an effectively uncrosslinked condition in conventional molding equipment to impart a shape to the connector formed, which is then permanently set by crosslinking, again by conventional techniques. By "effectively uncrosslinked", we recognize that the very act of molding the material will result in some small amount of crosslinking, but that the final and critical crosslinking occurs after the material has been formed into the final desired shape. Additional aspects of the preferred embodiment of the invention may be imparted to the connector being formed during the shaping process, as will be discussed in more detail below.

In FIG. 2, the tubing assembly 110 of the present invention is shown with a "L" shape connector 112 being substituted for the prior art linear connector 20 shown in FIG. 1. While the "L" shape shown is a two-ended version of a connector 112 useful in the present invention, there are many other known shapes which can be molded using the technique described above, including the three-ended connectors generally referred to as "T" or "Y" connectors, and the four-ended connector known as a "cross" or an "X." Although not commonly used, it is certainly possible to have more than four ends on connector 112. In the preferred embodiments, the connector 112 will be sized to match the internal and external diameters of the tubing with which it will be used, thereby allowing a symmetrical insert 20 and the same size crimp ring 30 to be used on both sides of the connection. The most commonly encountered sizes of tubes with which this invention is anticipated as being used are the nominal ½-inch and ¾-inch internal diameter tubes, although the invention is certainly not limited to those sizes and smaller sizes such as ⅜-inch and larger sizes such as 1-inch are included as are small and larger specialty sizes.

The connector 112 which is used in the present invention for joining at least two tubes 12,14 will have a central portion 124 and a plurality of arm ends 116, one such arm end at a distal end of each of a plurality of arms 120. The arms 120 have a proximal end 116 integral with the central portion 124. Typically, one arm end 116 will be paired with each tube end 16 of the tubes (such as 12,14 in FIG. 2) to be joined in the assembly 110. The connector 112 has an internal conduit 124 having an inner diameter 122 defined by inner walls 118 communicating with the arm ends 116, such that the internal conduit in the central portion 124 has a permanently formed feature 114 therein. In the particular case shown with an "L" connector, the permanently formed feature 114 is the 90° bend in the internal conduit 124. Clearly, the other connectors are within the scope of the invention and may have a different permanently formed feature. Once the connector 112 is provided, FIG. 2 shows that the tubing assembly 110 may be formed through exactly the same joining process taught with respect to FIG. 1.

FIG. 3 illustrates yet another embodiment of this invention which once again includes a permanently formed feature 160, showing a 90° bend between each respective arm 164 of connector 158. In this configuration, which eliminates the need for two crimp rings 30, nipples 168 are integrally formed thereupon each connector arm 164. Each nipple 168 has a radially expanded bulbous portion 152 with a plurality of radially expanded ribs 154 terminating at terminal end 156. The connector 158 has an internal conduit having an inner diameter 162 defined by inner walls 166 communicating with the terminal ends 156. The connector system 150 achieves leak-proof engagement of tube arms 12,14, by radial compression of crimp rings 30 about an exterior surface of metal tube 34 which effects corresponding radial compression of inner diameter 38 of polymeric tube 36 to come into frictional contact with a nipple 168 of an arm 164 of connector 158.

Figure 6:
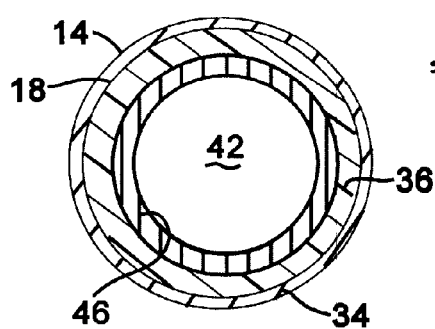
FIG. 6 shows an enlarged cross-sectional view of an alternative embodiment of the polymeric-lined metal-encased tubing segment showing a coextruded polymer tube.

FIG. 4 illustrates a cross-section of one arm of the system illustrating the outer metal tube 34 with polymeric tube 36 essentially centrally disposed therein, said inner diameter 38 of the polymeric tube defining a hollow conduit 42. While the tube within a tube is shown to have an essentially frictional fit between the inner and outer tubes, it is possible to have a small gap between the tubes to facilitate insertion of the inner tube. In an alternative embodiment of the invention illustrated in FIG. 6, the polymeric tube is comprised of two polymers, a first outer polymer 36 and a second inner polymer 46 defining a hollow conduit 42. In a preferred embodiment, the polymers which comprise the first and second polymers are coextruded, although this is not essential. The value in having two polymers, preferably of different composition, is that it is possible to maximize the barrier characteristics of the polymers. In one embodiment, the polymer combination could be crosslinked polyethylene for one polymer and polyethylenevinyl alcohol as the barrier polymer. Using this combination is valuable in that applications such as refrigeration hosing, as may be used for example to air conditioning units, may be replaced using this combination system replacing hoses which have rubber on the outside. Additionally, the insulation properties may be superior to the use of one polymer.

Figure 5:
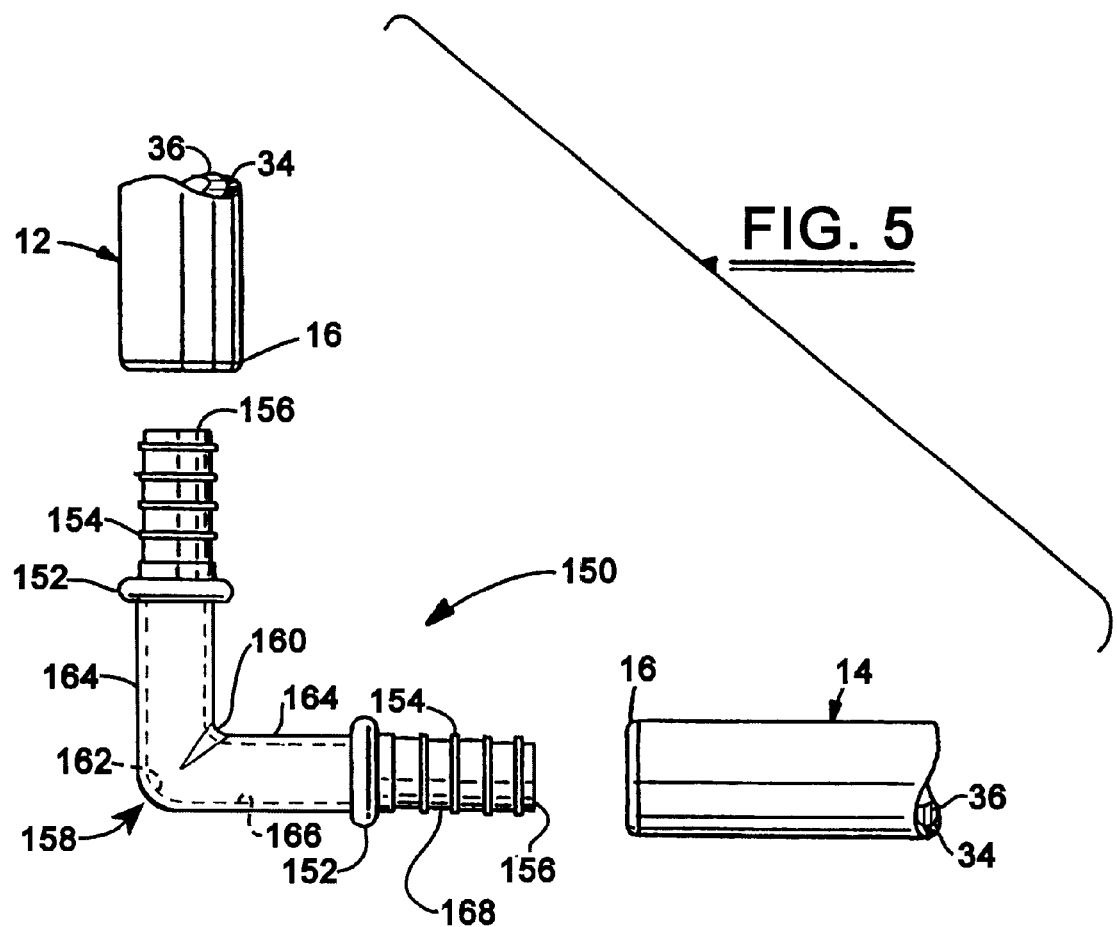
FIG. 5 shows an alternative embodiment of a tubing assembly of the present invention using a one-piece multi-ribbed metallic connector with an expanded nipple section for use without crimp rings.

FIG. 5 illustrates yet another embodiment of the invention which eliminates the need for a crimp ring 30. In this embodiment, each nipple 168 is axially extended so as to permit a crimping tool to compressively deform an outer surface of the metallic tube 34 with corresponding compression deformation of an inner polymeric tube 36 effecting leak-proof contact of an inner side of said polymeric tube with an exterior side of said connector 158. When used without crimp rings, it is preferred to utilize at least two compressive deformations to insure leak-proof engagement between the inner polymeric tube with the nipples on the connector.

Figure 7:
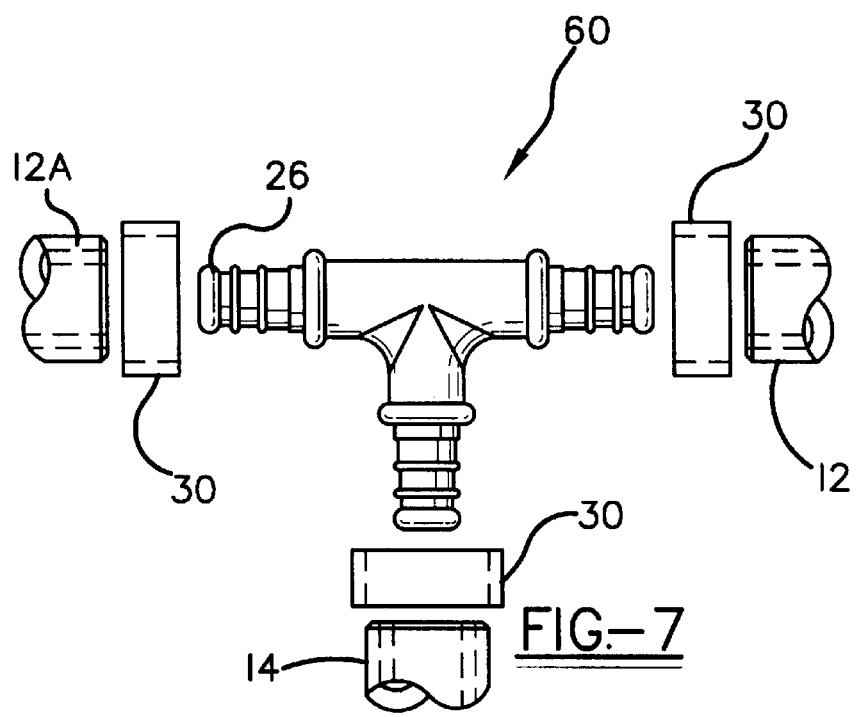
FIG. 7 shows a three-armed "T" connector.
Figure 8:
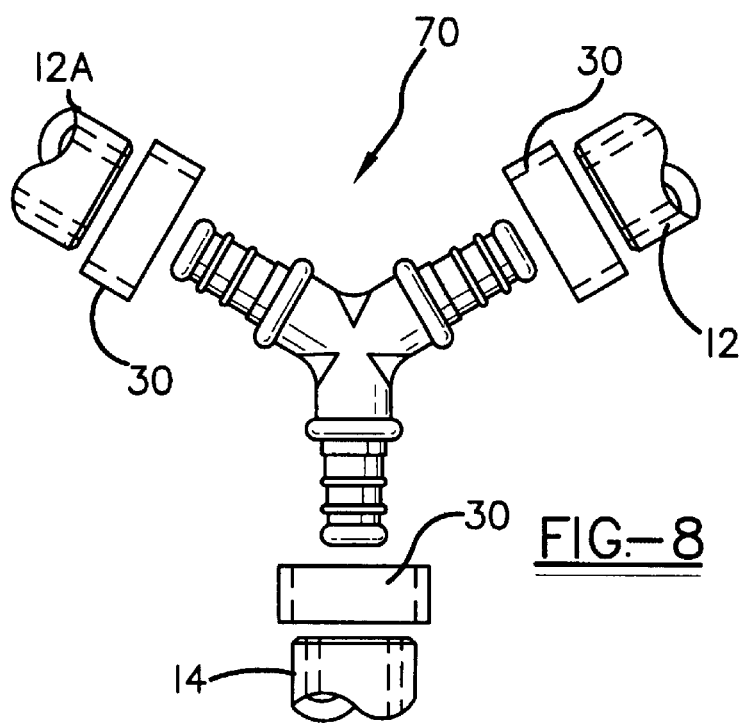
FIG. 8 shows a three-armed "Y" connector.
Figure 9:
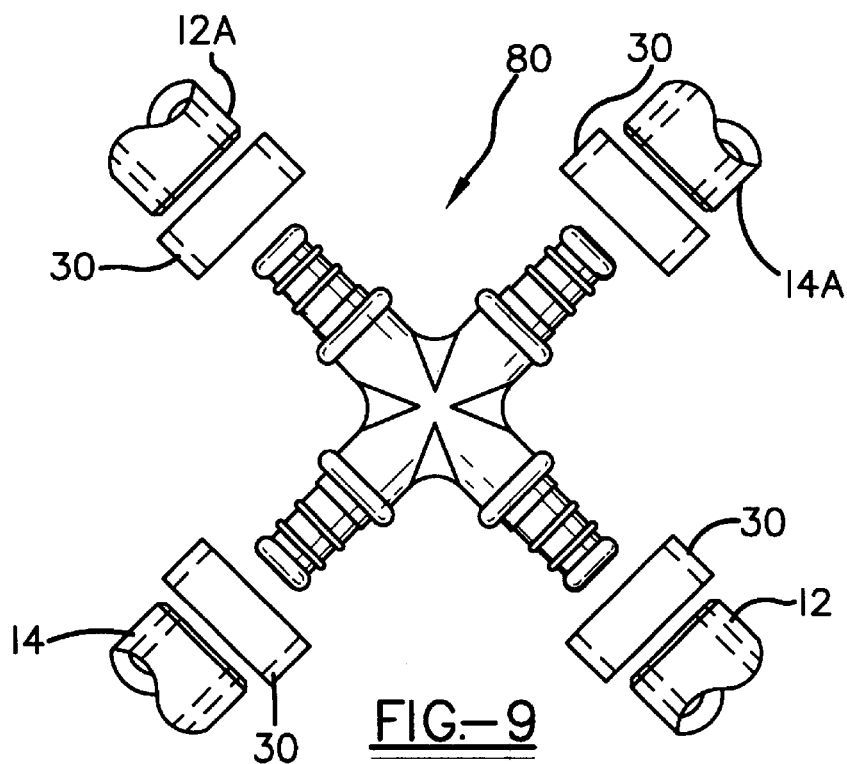
FIG. 9 shows a four-armed "X" connector.
Figure 10:
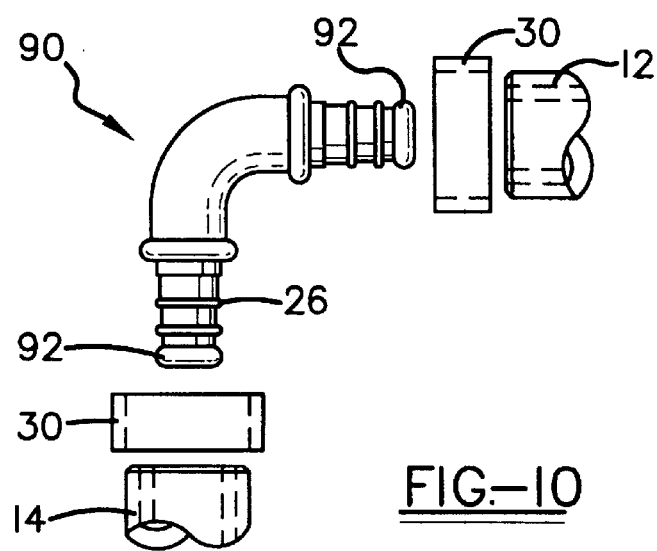
FIG. 10 shows two-armed elbow.
Figure 11:
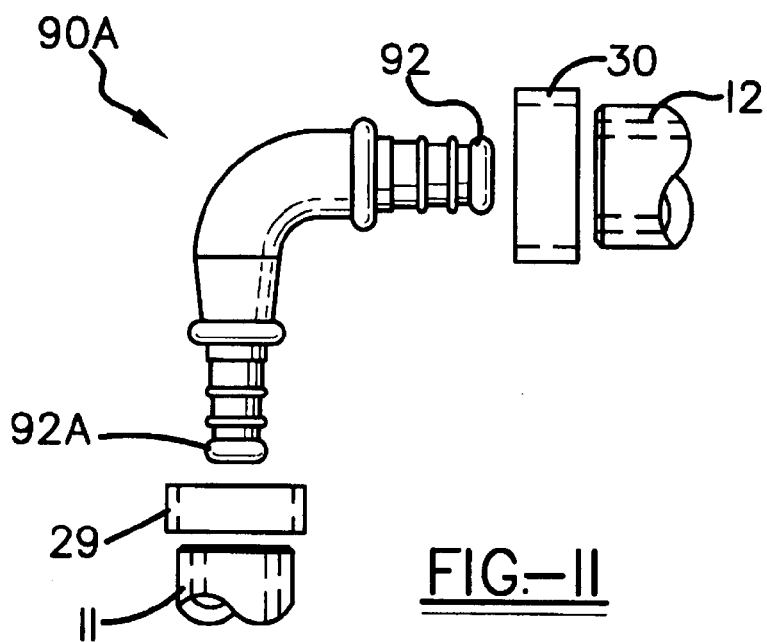
FIG. 11 shows a two-armed reducing elbow.
Figure 12:
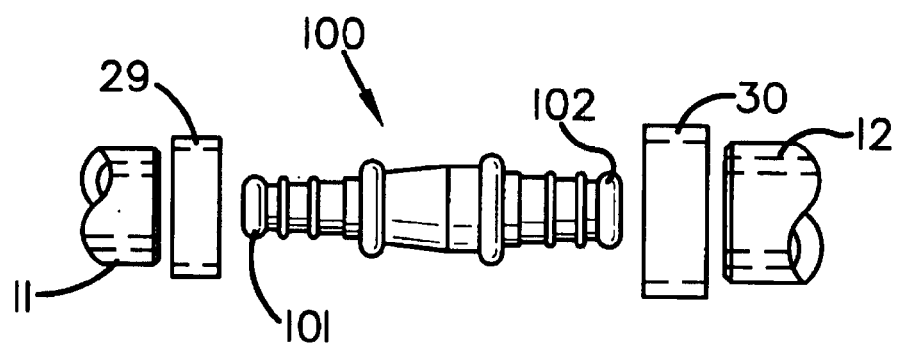
FIG. 12 shows a linear reducer.

FIG. 7 illustrates yet another embodiment of the invention illustrating a "T" connector 60 connecting three tube arms 12, 12a, 14 with crimp rings 30 in compressive contact with the arms and ribs 26. FIG. 8 is an embodiment similar to FIG. 7 illustrating a "Y" connector 70 once again connecting three arms as described previously. FIG. 9 illustrates an "X" connector 80 connecting opposed tube arms 12, 12a as well as 14, 14a in an analogous manner. FIG. 10 illustrates an elbow connector 90 having opposed ends 92 bent at approximately 90° with a plurality of ribs 26 which are used to fasten tube arms 12, 14 via crimp rings 30. FIG. 11 is a view similar to FIG. 10 wherein the elbow is a reducing elbow 90a in which approximately 90° bent ends 92, 92a are of different diameters, thereby requiring a smaller diametered crimp ring 29 in compressive engagement with smaller diametered tube arm 11 in comparison to crimp ring 30 in compressive engagement with larger diametered tube arm 12. FIG. 12 is an example of a linear reducer 100 in which the connector has a larger end 102 and a smaller diametered end 101. As described in relationship to FIG. 11, a smaller diameter crimp ring 29 is in compressive engagement with the smaller diametered tube arm 11 while the larger diametered crimp ring 30 is in compressive engagement with the larger diametered tube arm 12.

While only a few polymers have been mentioned, the present invention is applicable to a wide variety of polymers, either singly or in combination, including polyolefins, polycarbonates, polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Additionally included would be mixtures of different polymers, such as polyphenylene ether/styrenic resin blends, polyvinylchloride/ABS or other impact modified polymers, such as methacrylonitrile containing ABS, and polyester/ABS or polyester plus some other impact modifier may also be used. Such polymers are available commercially or may be made by means well known in the art.

More specifically, polymers of monoolefins and diolefins, for example would include polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with polyisobutylene, polypropylene with polyethylene (for example PP/HDPE), may also be used. Also useful are copolymers of monoolefins and diolefins with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidene-norbornene; as well as mixtures of such copolymers and their mixtures with polymers mentioned above, for example polypropylene/ethylene-propylene copolymers, LDPE/EVA, LDPE/EAA, LLDPE/EVA and LLDPE/EAA.

Thermoplastic polymers may also include styrenic polymers, such as polystyrene, poly-(p-methylstyrene), poly-(α-methylstyrene), copolymers of styrene or .alpha.-methylstyrene with dienes or acrylic derivatives, such as, for example, styrene/butadiene, styrene/acrylonitrile, styrene/alkyl methacrylate, styrene/maleic anhydride, styrene/butadiene/ethyl acrylate, styrene/acrylonitrile/methacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, acrylonitrile/butadiene/styrene (ABS), and ABS which includes methacrylonitrile.

Polymers based on acrylic acids, include acrylic acid, methacrylic acid, methyl methacrylate acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homopolymers and copolymers, polyvinyl chloride, polyvinyl bromide, polyvinyl fluoride, polyvinylidene chloride, chlorinated polyethylene, chlorinated polypropylene, fluorinated polyvinylidene, brominated polyethylene, chlorinated rubber, vinyl chloride-vinylacetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally plasticized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethylene with contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysulfones, polyethersulfones and polyetherketones; and polyesters which are derived from dicarboxylic acid and diols and/or from hydroxycarboxylic acids or the corresponding lactones, such as polyethylene terephthalate, polybutylene terephthalate, poly-1,4-dimethyliol-cyclohexane terephthalate, poly-[2,2,4-(4-hydroxyphenyl)-propane] terephthalate and polyhydroxybenzoates as well as block copolyetheresters derived from polyethers having hydroxyl end groups.

Polyamides and copolyamides which are derived from diamines and dicarboxylic acids and/or from aminocarboxylic acids or the corresponding lactams, such as polyamide-4, polyamide-6, polyamide-6/6, polyamide-6/10, polyamide-6/9, polyamide-6/12, polyamide-4/6, polyamide-11, polyamide-12, aromatic polyamides obtained by condensation of m-xylene, diamine and adipic acid; polyamides prepared from hexamethylene diamine and isophthalic and/or terephthalic acid and optionally an elastomer as modifier, for example, poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols, and polyamides or copolyamides modified with EPDM or ABS may be used.

While copper is the preferred metal for the outer metallic tube 34, it is recognized that the invention is not limited to the same, and that any metal is useful in the invention, e.g., steel, aluminum, chrome-plated copper, etc.

Figure 13:
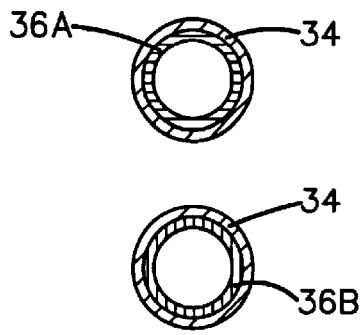
FIG. 13 shows an side elevational view of a portion of a connector system wherein the polymer has a visible colorant disposed therein.
Figure 14:
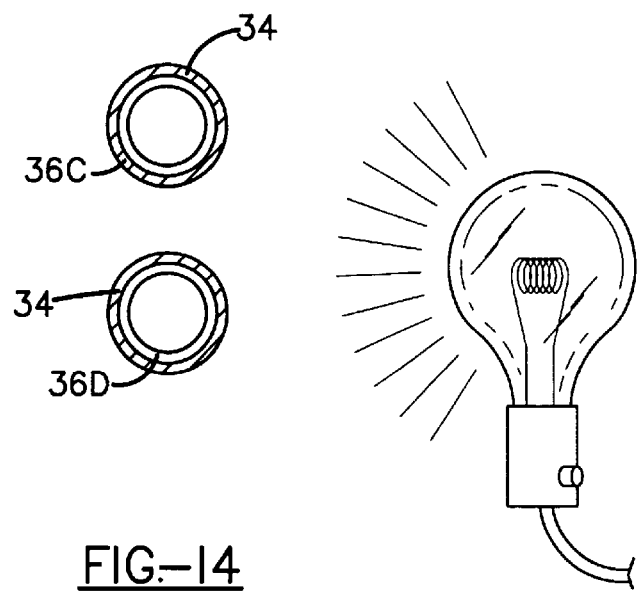
FIG. 14 shows a side elevational view of a portion of a connector system wherein the polymer has a colorant which is not visible under visible light illumination.
Figure 15:
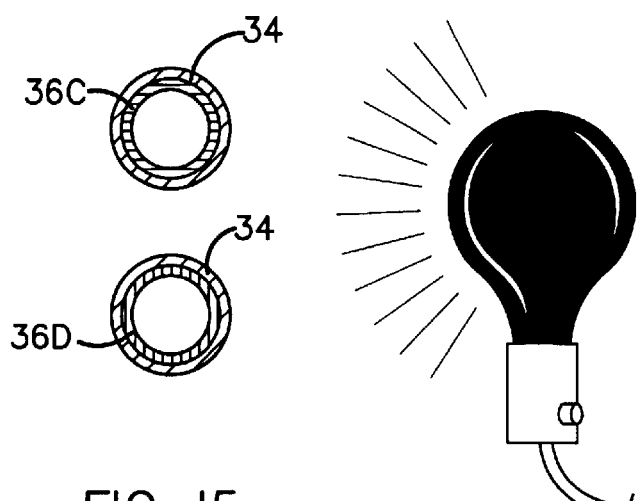
FIG. 15 shows a side elevational view of a portion of a connector system wherein the polymer had a colorant which is visible under non-visible light illumination.

In yet another embodiment of this invention illustrated in FIGS. 13–15, each of said inner polymeric tubes is color coded at least at an end, and often throughout the polymer, to permit identification of either a "hot" or a "cold" water line. This color coding is effected by either the incorporation of a colorant into the polymer during the extrusion process, or as purchased from a supplier already blended therein. Said colorant is typically visible under normal conditions of illumination as shown in FIG. 13 wherein inner polymeric tube is illustrated to be blue 36a while the same inner polymeric tube is also indicated to be red 36b for distinguishing between "cold" and "hot" water lines respectively, or may be invisible and only detectable by exposure to ultraviolet light or other light from other ranges of the wavelength spectrum, for example, see FIGS. 14–15 wherein inner polymeric tubes 36c, 36d are illustrated to be non-colored when exposed to visible light (FIG. 14) while the same inner polymeric tubes are illustrated to be blue and red respectively when exposed to ultraviolet light (FIG. 15). It is preferable to have the polymeric tubes color coded with widely different colors, e.g., blue or black for cold water, and red or orange for hot water. This color coding, which is visible by looking at an end of the metal-encased, polymer-lined tubing, is an effective way to minimize cross linking of hot and cold water pathways. In one embodiment, the colorant is a fluorescing pigment or dye which is added into the polymer which emits a defined wavelength of light from the electromagnetic spectrum upon excitation by an appropriate wavelength of incident light.

It is understood that due to the higher temperatures experienced with hot water, the polymeric inner tube is often a thermoset and often is a crosslinked polymer to increase the heat stability of the polymer. This increased heat stability is often not necessary with cold water pathways.

By having a large polymeric surface area in intimate contact with either a nipple of an insert or with a nipple of the connector, it is possible to eliminate the need for any "O-rings," non-limiting examples of said rings including EPDM (ethylene-propylene diene monomer), VITON, BUNA-N or neoprene.

In a preferred embodiment, the polymers will have an antioxidant or metal deactivator, such as is commercially available from a variety of sources. In particular, non-limiting exemplary antioxidants useful in the practice of this invention include the following.

| Chemical Name | Chemical Formula |
|---|---|
| pentaerythritol tetrakis(3-(3,5-di-tert-butyl-4-hydroxyphenyl)propionate | $\left[ HO\text{-}C_6H_2((CH_3)_3C)_2\text{-}(CH_2)_2\text{-}\underset{\underset{O}{\parallel}}{C}\text{-}OCH_2 \right]_4 C$ |
| thiodiethylene bis [3,5-di-tert-butyl-4-hydroxyphenyl)propionate] | $\left[ HO\text{-}C_6H_2((CH_3)_3C)_2\text{-}(CH_2)_2\text{-}\underset{\underset{O}{\parallel}}{C}\text{-}O(CH_2)_2 \right]_2 S$ |

-continued

| Chemical Name | Chemical Formula |
|---|---|
| octadecyl-3-(3,5-di-tert-butyl-4-hydroxyphenyl)-propionate | 3,5-di-tert-butyl-4-hydroxyphenyl group with $-(CH_2)_2-C(=O)-OC_{18}H_{37}$ |
| 6,6'-di-tert-butyl-2,2'-thiodi-p-cresol | Two 2-hydroxy-3-tert-butyl-5-methylphenyl groups linked by S |
| N-N'-hexane-1,6-diylbis(3-(3,5-di-tert-butyl-4-hydroxyphenyl-propionamide)) | Two 3,5-di-tert-butyl-4-hydroxyphenyl-propionamide groups linked by $-(CH_2)_6-$ |
| benzenepropanoic acid, 3,5-bis(1,1-dimethyl-ethyl)-4-hydroxy-.$C_7$–$C_9$ branched alkyl esters | 3,5-di-tert-butyl-4-hydroxyphenyl-$CH_2CH_2C(=O)O$-i-$C_8H_{17}$ |
| mixture of phenol, 2,4-dimethyl-6-(1-methylpentadecyl) and octdecyl-3-(3,5-di-tert-butyl-4-hydroxy-phenyl)-propionate | 2-hydroxy-3,5-dimethylphenyl with $-CH(CH_3)C_{14}H_{29}$; and 3,5-di-tert-butyl-4-hydroxyphenyl-$(CH_2)_2-C(=O)-OC_{18}H_{37}$ |
| 3,3',3'',5,5',5''-hexa-tert-butyl-a,a',a''-(mesitylene-2,4,6-triyl)tri-p-cresol) | Mesitylene core with three (3,5-di-tert-butyl-4-hydroxybenzyl) substituents |

| Chemical Name | Chemical Formula |
| --- | --- |
| calcium diethyl bis(((3,5-bis(1,1-dimethylethyl)-4 hydroxyphenyl)methyl) phosphonate) | |
| 4,6-bis(octylthiomethyl)-o-cresol | |
| hexamethylene bis(3-(3,5-di-tert-butyl-4-hydroxyphenyl) propionate) | |
| 2-(1,1-dimethyl)-6-[3-(1,1-dimethylethyl)-2-hydroxy-5-methylphenyl]methyl-4-methylphenyl acrylate | |
| 1,3,5-tris(3,5-di-tert-butyl-4-hydroxybenzyl)-1,3,5-triazine-2,4,6(1H,3H,5H)-trione | |

-continued

| Chemical Name | Chemical Formula |
|---|---|
| (2,4,6-trioxo-1,3,5-triazine-1,3,5(2H,4H,6H)-triyl)triethylene tris(3-(3,5-di-tert-butyl-4-hydroxyphenyl)propionate) | |
| 2,2'-oxidobis[ethyl 3-(3,5-di-tert-butyl-4-hydroxyphenyl)propionate] | |
| mixture of 2-(1-methylpropyl)-4,6-dinitrophenol and N-(1,4-dimethylpentyl)-N'-phenyl-1,4-benzenediamine | |
| 4-methyl-2,6-bis(2-phenylethenyl) phenol | |
| bis[(3,5-di-tert-butyl-4-hydroxyphenyl)propionyl-2-oxyethyl] sulfide | |

-continued

| Chemical Name | Chemical Formula |
|---|---|
| tris(2,4-di-tert-butylphenyl) phosphite | [structure: P(O-C₆H₃(C(CH₃)₃)₂)₃ — three 2,4-di-tert-butylphenoxy groups attached to phosphorus] |
| 2,2,4-trimethyl-1,2-dihydroquinoline polymer | [structure: 2,2-dimethyl-1,2-dihydroquinoline with N–H] |
| tris(nonylphenyl) phosphite | [structure: P(O-C₆H₄-(CH₂)₆CH₃)₃] |
| 4-(1-methyl-1-phenylethyl)-N-[4-(1-methyl-1-phenylethyl)phenyl]-benzeneamine | [structure: Ph-C(CH₃)₂-C₆H₄-NH-C₆H₄-C(CH₃)₂-Ph] |
| tetrakis(3,5-di-tert-butyl-4-hydroxyhydrocinnamate) pentaerythritol | [structure: [HO-C₆H₂(C(CH₃)₃)₂-(CH₂)₂-C(=O)-OCH₂]₄C] |
| 2,6-di-tert-butyl-4-(octadecanoxycarbonylethyl) phenol | [structure: HO-C₆H₂(C(CH₃)₃)₂-(CH₂)₂-C(=O)-O(CH₂)₁₇-CH₃] |
| distearyl 3,3'-thiodipropionate | CH₃—(CH₂)₁₇O—C(=O)—(CH₂)₂S(CH₂)₂—C(=O)—O(CH₂)₁₇—CH₃ |

-continued

| Chemical Name | Chemical Formula |
|---|---|
| 2,6-di-tert-butyl-p-cresol | (structure) |
| N-isopropyl-N'-phenyl-1,4-phenylenediamine | (structure) |
| p-(p-tolylsulfonylamido) diphenylamine | (structure) |
| N-phenyl-1-naphthylamine | (structure) |
| 1,4-dihydroxy-2,5-di-tert-butyl benzene | (structure) |
| diphenyl-p-phenylene diamine | (structure) |
| bis(2,4-di-cumylphenyl) pentaerythritol diphosphite | (structure) |

-continued

| Chemical Name | Chemical Formula |
|---|---|
| tris(3,5-di-tert-butyl-4-hydroxybenzyl) isocyanurate | |
| bis(2,4-di-tert-butylphenyl)pentaerythritol diphosphite | |
| distearyl pentaerythritol diphosphite | |
| 2,4,6-tri-tert-butylphenyl-2-butyl-2-ethyl-1,3-propanediol phosphite | |
| 2,2',2"-nitrilo[triethyl tris 3,3',5,5'-tetra-tert-butyl-1,1'biphenyl-2,2'-diyl) phosphite] | |

In fabrication of the polymer-lined, metal-encased tubing segment connector system, it is often desirable to have the polymer tube having an outer diameter which is smaller than an inner diameter of the metal tube. With this particular geometry, it is possible to quickly insert fairly long lengths of polymer tubing into the metal tubing without undue pressure or snagging. Subsequent to insertion, and in a most highly desirable mode, the outer metal tubing is subjected to an inwardly compressive circumferential force ("swaging") which narrows both the outer and inner diameters of the metallic tubing so as to snugly fit the inner diameter of the metallic tubing about the outer diameter of the polymer tubing.

Alternatively, the tube within a tube could be formed by sliding at least a partially crosslinked polymer, which has been drawn down, i.e. which has been reduced in O.D., so that the O.D. of the polymer tube is less than the I.D. of the metallic tube, followed by subsequent reheating of the polymer tube, the reheating capitalizing on the memory of a drawn down crosslinked material to return to its original dimension and fill the cavity of the metal tube. Specifically, at least partially crosslinked polymer, at least 50%, more preferably 60%, most preferably fully crosslinked, is reduced in outer diameter through a drawing operation with heat and a die wherein the heated tube is run through a die to make the outer diameter smaller than its original extruded dimension. This tubing is then inserted into the metallic tube, preferably copper, wherein the two tubes are reheated and the memory of crosslinked polymers, particularly polyethylene, expands to its original dimension which is essentially equivalent to the internal diameter of the metallic tube. Utilization of this process allows the easy and economic manufacture of this tube within a tube by facile insertion and memory expansion. By using crosslinked polyethylene, it is possible to use the "no stick" feature of crosslinked polyethylene tubing since it will not tack off during the drawing process should the internal diameter of the tube collapse at any point. Normal materials would tack off as soon as they touch and that would make the drawing and inserting operation much more critical. This new route has a higher degree of tolerance in the manufacturing process.

Still another alternative method for forming the tube within a tube is to use "air-core" molding in which a polymer tube (either crosslinked or non-crosslinked) is inserted into the metallic tube, followed by sealing one end of the polymeric tube. This sealing may be effected by crimping, heat sealing, insertion of a sealing means, e.g., stopper, or by any other means known in the art, followed by heating to a temperature at which the polymeric tube becomes processable. It is recognized that the sealing and/or heating steps may be interchanged at the preference of the user. At this processable temperature, a pressurizing means (e.g., compressed gas) is used to radially expand the inner polymer tube to contact the inner wall of the metal tube.

While in a preferred embodiment, the length of the inner polymeric tube will be essentially equal to that of the outer metallic tube, there is no need to limit the invention to such equivalent dimensions. In an alternative embodiment, the inner polymer tube is located at either end, and penetrates only to the extent necessary to effect leak-proof connection with an inserted connector. It is additionally recognized that in one embodiment of this invention, the inner polymeric tube will be positioned at only one end of the metallic tube and partially penetrate thereinto while an opposed second end could be fastened to a connector by any traditional manner.

It is equally understood that thickness of either the inner or outer tubes plays essentially a limited role in the invention. The combination of the thickness of the two tubes must be sufficient to withstand recognized plumbing standards for burst strength, but it is recognized that this may be effected in various ways. The inner polymeric liner could be made relatively thick when a polymer having relatively little structural integrity is used or could be made relatively thin when a polymer having high structural integrity is used. Additionally, in light of the fact that in a preferred embodiment, the metallic outer tube is supplemented with an inner tube, the thickness of the metal tube can be relatively thinner than normal, although it does not have to be. In general, the thickness of the polymer can be as low as approximately 30 thousands of an inch or as high as approximately one-quarter of an inch thick. The thickness of the metallic tube can be as low as approximately 70 thousands of an inch or as high as approximately one-quarter of an inch thick and combinations therebetween. There are essentially no practical limits on the hardness of the metallic tubes, particularly copper.

It should also be noted that as an alternative to a relatively snug-fitting relationship between the inner and outer tubes, or as a supplement to when the two tubes are snugly fit, it is recognized that it is possible to periodically or sporadically disform the exterior metallic tube to as to minimize or prohibit sliding of the inner tube within the outer tube. This disforming can take many shapes, non-limiting examples including crimping, pinching, bending, etc.

This invention has been described in detail with reference to specific embodiments thereof, including the respective best modes for carrying out each embodiment. It shall be understood that these illustrations are by way of example and not by way of limitation. Accordingly, the scope and content of the present invention are to be defined only by the terms of the appended claims.

What is claimed is:

1. A tubing assembly which comprises:
   (a) at least two tubes, each tube having a pair of tube ends, each tube further comprising
      (i) an outer metallic tube, and
      (ii) at least one inner polymeric tube, said inner polymeric tube at least partially inserted into said outer metallic tube, at least one end of each of said tubes being essentially coterminal, an inner diameter of said inner polymeric tube defining an internal conduit;
   (b) a connector for joining the at least two said tubes, the connector comprising
      (i) a central portion with an internal conduit, and
      (ii) at least two arms, each arm extending from the central portion and terminating in an arm end, such that there is one arm and arm end paired with each said tube end, with the connector internal conduit extending through the arms to the respective arm ends;
   (c) at least one insert, such that there is one insert for each arm end and tube end pair,
      (i) a first nipple portion of each said insert having an external surface frictionally engaged in an internal surface of the connector internal conduit at the arm end, and
      (ii) a second nipple portion of each said insert having an external surface frictionally engaged in an internal surface of the inner polymeric tube internal conduit at the tube end; and
   (d) at least one sealing means for joining the connector internal conduit to the tube internal conduit in a leak-free manner.

2. The tubing assembly of claim 1 wherein said at least one sealing means is at least one ring member, such that one said ring member is slidingly received along each tube end or arm end atop one of the inserts frictionally engaged therein, the ring member compressively deforming the respective tube end or arm end onto the insert.

3. The tubing assembly of claim 1 wherein said central portion of said connector has a permanently formed feature therein, said permanently formed feature selected from the group consisting of an angular diversion, an intersecting conduit, a smooth reduction of the internal and external diameters, and combinations thereof.

4. The tubing assembly of claim 1 wherein
   (a) the connector is metallic.
5. The tubing assembly of claim 1 wherein
   (a) the connector has two arms.
6. The tubing assembly of claim 1 wherein
   (a) the connector has three arms.
7. The tubing assembly of claim 6 wherein
   (a) the arms are arranged in a "T" shape.
8. The tubing assembly of claim 6 wherein
   (a) the arms are arranged in a "Y" shape.
9. The tubing assembly of claim 1 wherein
   (a) the connector has four arms.
10. The tubing assembly of claim 1 wherein
    (a) the connector is a linear reducer.
11. The tubing assembly of claim 1 wherein
    (a) the connector is a reducing elbow.
12. The tubing assembly of claim 1 wherein (a) said nipple portions of said insert radially expand toward a middle of said insert.

13. The tubing assembly of claim 1 wherein
(a) an outer diameter of said inner polymeric tube and an inner diameter of said outer metallic tube are essentially equal, yet permit sliding insertion of said inner polymeric tube within said outer metallic tube.

14. The tubing assembly of claim 1 wherein
(a) said inner polymeric tube has a colorant incorporated therein.

15. The tubing assembly of claim 14 wherein
(a) said colorant is visible when exposed to visible illumination.

16. The tubing assembly of claim 14 wherein
(a) said colorant is invisible when exposed to visible illumination, but visible under exposure to non-visible spectrum illumination.

17. The tubing assembly of claim 1 wherein
(a) said polymeric tube further comprises an antioxidant.

18. The tubing assembly of claim 1 wherein said antioxidant is selected from the group consisting of pentaerythritol tetrakis(3-(3,5-di-tert-butyl-4-hydroxyphenyl)propionate, thiodiethylene bis(3,5-di-tert-butyl-4-hydroxyphenyl) propionate), octadecyl-3-(3,5-di-tert-butyl-4-hydroxyphenyl)-propionate, 6,6'-di-tert-butyl-2,2'-thiodi-p-cresol, N-N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-.$C_7$–$C_9$ branched alkyl esters, mixture of phenol, 2,4-dimethyl-6-(1-methylpentadecyl) and octdecyl-3-(3,5-di-tert-butyl-4-hydroxy-phenyl)-propionate, 3,3',3',5,5',5'-hexa-tert-butyl-a,a',a'-(mesitylene-2,4,6-triyl)tri-p-cresol), calcium diethyl bis(((3,5-bis(1,1-dimethylethyl)-4-hydroxyphenyl)methyl) phosphonate), 4,6-bis(octylthiomethyl)-o-cresol, hexamethylene bis(3-(3,5-di-tert-butyl-4-hydroxyphenyl)propionate), 2-(1,1-dimethyl)-6-(3-(1,1-dimethylethyl)-2-hydroxy-5-methylphenyl)methyl-4-methylphenyl acrylate, 1,3,5-tris(3, 5-di-tert-butyl-4-hydroxybenzyl)-1,3,5-triazine-2,4,6(1H, 3H,5H)-trione, (2,4,6-trioxo-1,3,5-triazine-1,3,5(2H,4H, 6H)-triyl)triethylene tris(3-(3,5-di-tert-butyl-4-hydroxyphenyl)propionate), 2,2'-oxidobis(ethyl 3-(3,5-di-tert-butyl-4-hydroxyphenyl)propionate), mixture of 2-(1-methylpropyl)-4,6-dinitrophenol and N-(1,4-dimethylpentyl)-N'-phenyl-1,4-benzenediamine, 4-methyl-2,6-bis(2-phenylethenyl)phenol, bis((3,5-di-tert-butyl-4-hydroxyphenyl)propionyl-2-oxyethyl)sulfide, tris(2,4-di-tert-butylphenyl)phosphite, 2,2,4-trimethyl-1,2-dihydroquinoline polymer, tris(nonylphenyl)phosphite, 4-(1-methyl-1-phenylethyl)-N-(4-(1-methyl-1-phenylethyl) phenyl)-benzeneamine, tetrakis(3,5-di-tert-butyl-4-hydroxyhydrocinnamate)pentaerythritol, 2,6-di-tert-butyl-4-(octadecanoxycarbonylethyl)phenol, distearyl 3,3'-thiodipropionate, 2,6-di-tert-butyl-p-cresol, N-isopropyl-N'-phenyl-1,4-pheylenediamine, p-(p-tolylsulfonylamido) diphenylamine, N-phenyl-1-naphthylamine, 1,4-dihydroxy-2,5-di-tert-butyl benzene, diphenyl-p-phenylene diamine, bis(2,4-dicumylphenyl)pentaerythritol diphosphite, tris(3,5-di-tert-butyl-4-hydroxybenzyl)isocyanurate, bis(2,4-di-tert-butylphenyl)pentaerythritol diphosphite, distearyl pentaerythritol diphosphite, 2,4,6-tri-tert-butylphenyl-2-butyl-2-ethyl-1,3-propanediol phosphite, and 2,2',2"-nitrilo (triethyl tris 3,3',5,5'-tetra-tert-butyl-1,1'biphenyl-2,2'-diyl) phosphite).

19. The tubing assembly of claim 1 wherein
(a) said at least one polymeric tube is at least two polymeric tubes.

20. The tubing assembly of claims 19 wherein
(a) said at least two polymeric tubes are coextruded.

21. A tubing assembly which comprises:
(a) at least two tubes, each tube having at least one tube end, each tube further comprising:
  (i) an outer metallic tube, and
  (ii) at least one inner polymeric tube, said inner polymeric tube at least partially inserted into said outer metallic tube, at least one end of each of said tubes being essentially coterminal, an inner diameter of said inner polymeric tube defining an internal conduit;
(b) a connector for joining the at least two said tubes, the connector comprising
  (i) a central portion with an internal conduit,
  (ii) a plurality of arms, each arm extending from the central portion and terminating in an arm end, such that there is one arm and arm end paired with each said tube end, with the connector internal conduit extending through the arms to the respective arm end, and
  (iii) each arm end having a longitudinally axially extending nipple portion emanating therefrom, each nipple having an external surface frictionally engaged in an internal surface of the inner polymeric tube internal conduit at the tube end, with the connector internal conduit extending through each nipple; and
(c) at least one sealing means for joining the connector internal conduit to the tube internal conduit in a leak-free manner.

22. The tubing assembly of claim 21 wherein said at least one sealing means is at least one ring member, such that one said ring member is slidingly received along each tube end or arm end atop one of the inserts frictionally engaged therein, the ring member compressively deforming the respective tube end or arm end onto the insert.

23. The tubing assembly of claim 21 wherein said central portion of said connector has a permanently formed feature therein, said permanently formed feature selected from the group consisting of an angular diversion, an intersecting conduit, a smooth reduction of the internal and external diameters, and combinations thereof.

24. The tubing assembly of claim 21 wherein
(a) the connector is metallic.

25. The tubing assembly of claim 21 wherein
(a) the connector has two arms.

26. The tubing assembly of claim 21 wherein
(a) the connector has three arms.

27. The tubing assembly of claim 26 wherein
(a) the arms are arranged in a "T" shape.

28. The tubing assembly of claim 21 wherein
(a) the arms are arranged in a "Y" shape.

29. The tubing assembly of claim 21 wherein
(a) the connector has four arms.

30. The tubing assembly of claim 21 wherein
(a) the connector is a linear reducer.

31. The tubing assembly of claim 21 wherein
(a) the connector is a reducing elbow.

32. The tubing assembly of claim 21 wherein
(a) said nipple portions of said insert radially expand toward a middle of said insert.

33. The tubing assembly of claim 21 wherein
(a) an outer diameter of said inner polymeric tube and an inner diameter of said outer metallic tube are essentially equal, yet permit sliding insertion of said inner polymeric tube within said outer metallic tube.

34. The tubing assembly of claim 21 wherein
(a) said inner polymeric tube has a colorant incorporated therein.

35. The tubing assembly of claim 34 wherein
(a) said colorant is visible when expose to visible illumination.

36. The tubing assembly of claim 34 wherein
(a) said colorant is invisible when exposed to visible illumination, but visible under exposure to non-visible spectrum illumination.

37. The tubing assembly of claim 21 wherein
(a) said polymeric tube further comprises an antioxidant.

38. The tubing assembly of claim 37 wherein said antioxidant is selected from the group consisting of pentaerythritol tetrakis(3-(3,5-di-tert-butyl-4-hydroxyphenyl) propionate, thiodiethylene bis(3,5-di-tert-butyl-4-hydroxyphenyl)propionate), octadecyl-3-(3,5-di-tert-butyl-4-hydroxyphenyl)-propionate, 6,6'-di-tert-butyl-2,2'-thiodi-p-cresol, N-N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-.$C_7$–$C_9$ branched alkyl esters, mixture of phenol, 2,4-dimethyl-6-(1-methylpentadecyl) and octdecyl-3-(3,5-di-tert-butyl-4-hydroxy-phenyl)-propionate, 3,3',3',5,5',5'-hexa-tert-butyl-a,a',a'-(mesitylene-2,4,6-triyl)tri-p-cresol), calcium diethyl bis(((3,5-bis(1,1-dimethylethyl)-4-hydroxyphenyl)methyl) phosphonate), 4,6-bis(octylthiomethyl)-o-cresol, hexamethylene bis(3-(3,5-di-tert-butyl-4-hydroxyphenyl)propionate), 2-(1,1-dimethyl)-6-(3-(1,1-dimethylethyl)-2-hydroxy-5-methylphenyl)methyl-4-methylphenyl acrylate, 1,3,5-tris(3, 5-di-tert-butyl-4-hydroxybenzyl)-1,3,5-triazine-2,4,6(1H, 3H,5H)-trione-, (2,4,6-trioxo-1,3,5-triazine-1,3,5(2H,4H, 6H)triyl)triethylene tris(3-(3,5-di-tert-butyl-4-hydroxyphenyl)propionate), 2,2'-oxidobis(ethyl 3-(3,5-di-tert-butyl-4-hydroxyphenyl)propionate), mixture of 2-(1-methylpropyl)-4,6-dinitrophenol and N-(1,4-dimethylpentyl)-N'-phenyl-1,4-benzenediamine, 4-methyl-2,6-bis(2-phenylethenyl)phenol, bis((3,5-di-tert-butyl-4-hydroxyphenyl)propionyl-2-oxyethyl)sulfide, tris(2,4-di-tert-butylphenyl)phosphite, 2,2,4-trimethyl-1,2-dihydroquinoline polymer, tris(nonylphenyl)phosphite, 4-(1-methyl-1-phenylethyl)-N-(4-(1-methyl-1-phenylethyl) phenyl)-benzeneamine, tetrakis(3,5-di-tert-butyl-4-hydroxyhydrocinnamate)pentaerythritol, 2,6-di-tert-butyl-4-(octadecanoxycarbonylethyl)phenol, distearyl 3,3'-thiodiopropionate, 2,6-di-tert-butyl-p-cresol, N-isopropyl-N'-phenyl-1,4-pheylenediamine, p-(p-tolylsulfonylamido) diphenylamine, N-phenyl-1-naphthylamine, 1,4-dihydroxy-2,5-di-tert-butyl benzene, diphenyl-p-phenylene diamine, bis(2,4-di-cumylphenyl)pentaerythritol diphosphite, tris(3, 5-di-tert-butyl-4-hydroxybenzyl)isocyanurate, bis(2,4-di-tert-butylphenyl)pentaerythritol diphosphite, distearyl pentaerythritol diphosphite, 2,4,6-tri-tert-butylphenyl-2-butyl-2-ethyl-1,3-propanediol phosphite, and 2,2',2"-nitrilo (triethyl tris 3,3',5,5'-tetra-tert-butyl-1,1'biphenyl-2,2'-diyl) phosphite).

39. The tubing assembly of claim 21 wherein
(a) said at least one polymeric tube is at fist two polymeric tubes.

40. The tubing assembly of claim 39 wherein
(a) said at least two polymeric tubes are coextruded.

41. A tubing assembly which comprises:
(a) at least two tubes, each tube having at least one tube end, each tube further comprising:
  (i) an inner polymeric tube, an inner diameter of said inner polymeric tube defining an internal conduit, and
  (ii) an outer metallic tube;
(b) a connector for joining the at least two said tubes, the connector comprising
  (i) a central portion with an internal conduit therein, and
  (ii) a plurality of arms, each arm extending from the central portion and terminating in an arm end, such that there is one arm and arm end paired with each said tube end, with the connector internal conduit extending through the arms to the respective arm ends;
(c) a plurality of inserts, such that there is one insert for each arm end and tube end pair,
  (i) a first nipple portion of each said insert having an external surface frictionally engaged in an internal surface of the connector internal conduit at the arm end, and
  (ii) a second nipple portion of each said insert having an external surface frictionally engaged in an internal surface of the inner polymeric tube internal conduit at the tube end; and
(d) a plurality of ring members, such that one said ring member is slidingly received along each tube end or arm end atop one of the inserts frictionally engaged therein, the ring member compressively deforming the respective tube end or arm end onto the insert, joining the connector internal conduit to the tube internal conduit in a leak-free manner.

42. The tubing assembly of claim 41 wherein the connector is selected from the group consisting of an angular diversion, an intersecting conduit, a smooth reduction of the internal and external diameters, a linear connector and combinations thereof.

43. The tubing assembly of claim 41 wherein
(a) the connector is metallic.

44. The tubing assembly of claim 41 wherein
(a) the connector has two arms.

45. The tubing assembly of claim 41 wherein
(a) the connector has three arms.

46. The tubing assembly of claim 45 wherein
(a) the arms are arranged in a "T" shape.

47. The tubing assembly of claim 45 wherein
(a) the arms are arranged in a "Y" shape.

48. The tubing assembly of claim 41 wherein
(a) the connector has four arms.

49. The tubing assembly of claim 41 wherein
(a) the connector is a linear reducer.

50. The tubing assembly of claim 41 wherein
(a) the connector is a reducing elbow.

51. The tubing assembly of claim 41 wherein
(a) said nipple portions of said insert radially expand toward a middle of said insert.

52. The tubing assembly of claim 41 wherein
(a) an outer diameter of said inner polymeric tube and an inner diameter of said outer metallic tube are essentially equal, yet permit sliding insertion of said inner polymeric tube within said outer metallic tube.

53. The tubing assembly of claim 41 wherein
(a) said inner polymeric tube has a colorant incorporated therein.

54. The tubing assembly of claim 53 wherein
(a) said colorant is visible when exposed to visible illumination.

55. The tubing assembly of claim 53 wherein
   (a) said colorant is invisible when exposed to visible illumination, but visible under exposure to non-visible spectrum illumination.

56. The tubing assembly of claim 41 wherein
   (a) said polymeric tube further comprises an antioxidant.

57. The tubing assembly of claim 56 wherein said antioxidant is selected from the group consisting of pentaerythritol tetrakis(3-(3,5-di-tert-butyl-4-hydroxyphenyl)propionate, thiodiethylene bis(3,5-di-tert-butyl-4-hydroxyphenyl)propionate), octadecyl-3-(3,5-di-tert-butyl-4-hydroxyphenyl)-propionate, 6,6'-di-tert-butyl-2,2'-thiodi-p-cresol, N-N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-.$C_7$–$C_9$ branched alkyl esters, mixture of phenol, 2,4-dimethyl-6-(1-methylpentadecyl) and octdecyl-3-(3,5-di-tert-butyl-4-hydroxy-phenyl)-propionate, 3,3',3',5,5',5'-hexa-tert-butyl-a,a',a'-(mesitylene-2,4,6-triyl)tri-p-cresol), calcium diethyl bis(((3,5-bis(1,1-dimethylethyl)-4-hydroxyphenyl)methyl)phosphonate), 4,6-bis(octylthiomethyl)-o-cresol, hexamethylene bis(3-(3,5-di-tert-butyl-4-hydroxyphenyl)propionate), 2-(1,1-dimethyl)-6-(3(1,1-dimethylethyl)-2-hydroxy-5-methylphenyl)methyl-4-methylphenyl acrylate, 1,3,5-tris(3,5-di-tert-butyl-4-hydroxybenzyl)-1,3,5-triazine-2,4,6(1H, 3H,5H)-trione, (2,4,6-trioxo-1,3,5-triazine-1,3,5(2H,4H,6H)-triyl)triethylene tris(3-(3,5-di-tert-butyl-4-hydroxyphenyl)propionate), 2,2'-oxidobis(ethyl 3-(3,5-di-tert-butyl-4-hydroxyphenyl)propionate), mixture of 2-(1-methylpropyl)-4,6-dinitrophenol and N-(1,4-dimethylpentyl)-N'-phenyl-1,4-benzenediamine, 4-methyl-2,6-bis(2-phenylethenyl)phenol, bis((3,5-di-tert-butyl-4-hydroxyphenyl)propionyl-2-oxyethyl)sulfide, tris(2,4-di-tert-butylphenyl)phosphite, 2,2,4-trimethyl-1,2dihydroquinoline polymer, tris(nonylphenyl)phosphite, 4-(1-methyl-1-phenylethyl)-N-(4-(1-methyl-1-phenylethyl)phenyl)-benzeneamine, tetrakis(3,5-di-tert-butyl-4-hydroxyhydrocinnamate)pentaerythritol, 2,6-di-tert-butyl-4-(octadecanoxycarbonylethyl)phenol, distearyl 3,3'-thiodiopropionate, 2,6-di-tert-butyl-p-cresol, N-isopropyl-N'-phenyl-1,4-pheylenediamine, p-(p-tolylsulfonylamido)diphenylamine, N-phenyl-1-naphthylamine, 1,4-dihydroxy-2,5-di-tert-butyl benzene, diphenyl-p-phenylene diamine, bis(2,4-di-cumylphenyl)pentaerythritol diphosphite, tris(3,5-di-tert-butyl-4-hydroxybenzyl)isocyanurate, bis(2,4-di-tert-butylphenyl)pentaerythritol diphosphite, distearyl pentaerythritol diphosphite, 2,4,6-tri-tert-butylphenyl-2-butyl-2-ethyl-1,3-propanediol phosphite, and 2,2',2"-nitrilo(triethyl tris 3,3',5,5'-tetra-tert-butyl-1,1'biphenyl-2,2'-diyl)phosphite).

58. The tubing assembly of claim 41 which further comprises
   (a) at least one second inner polymeric tube.

59. The tubing assembly of claim 58 wherein
   (a) said polymeric tubes are coextruded.

60. A tubing assembly which comprises:
   (a) at least two tubes, each tube having at least one tube end, each tube further comprising:
      (i) an inner polymeric tube, an inner diameter of said inner polymeric tube defining an internal conduit, and
      (ii) an outer metallic tube;
   (b) a connector for joining the at least two said tubes, the connector comprising
      (i) a central portion with an internal conduit therein,
      (ii) a plurality of arms, each arm extending from the central portion and terminating in an arm end, such that there is one arm and arm end paired with each said tube end, with the connector internal conduit extending through the arms to the respective arm end, and
      (iii) each arm end having a longitudinally axially extending nipple portion emanating therefrom, each nipple having an external surface frictionally engaged in an internal surface of the inner polymeric tube internal conduit at the tube end, with the connector internal conduit extending through each nipple; and
   (c) a plurality of ring members, such that one said ring member is slidingly received along each tube end or arm end atop one of the nipples frictionally engaged therein, the ring member compressively deforming the respective tube end or arm end onto the nipple, joining the connector internal conduit to the tube internal conduit in a leak-free manner.

61. The tubing assembly of claim 60 wherein the permanently formed feature is selected from the group consisting of an angular diversion, an intersecting conduit, a smooth reduction of the internal and external diameters, and combinations thereof.

62. The tubing assembly of claim 60 wherein
   (a) the connector is metallic.

63. The tubing assembly of claim 60 wherein
   (a) the connector has two arms.

64. The tubing assembly of claim 60 wherein
   (a) the connector has three arms.

65. The tubing assembly of claim 64 wherein
   (a) the arms are arranged in a "T" shape.

66. The tubing assembly of claim 64 wherein
   (a) the arms are arranged in a "Y" shape.

67. The tubing assembly of claim 60 wherein
   (a) the connector has four arms.

68. The tubing assembly of claim 60 wherein
   (a) the connector is a linear reducer.

69. The tubing assembly of claim 60 wherein
   (a) the connector is a reducing elbow.

70. The tubing assembly of claim 60 wherein
   (a) said nipple portions of said insert radially expand toward a middle of said connector.

71. The tubing assembly of claim 60 wherein
   (a) an outer diameter of said inner polymeric tube and an inner diameter of said outer metallic tube are essentially equal, yet permit sliding insertion of said inner polymeric tube within said outer metallic tube.

72. The tubing assembly of claim 60 wherein
   (a) said inner polymeric tube has a colorant incorporated therein.

73. The tubing assembly of claim 72 wherein
   (a) said colorant is visible when exposed to visible illumination.

74. The tubing assembly of claim 72 wherein
   (a) said colorant is invisible when exposed to visible illumination, but visible under exposure to non-visible spectrum illumination.

75. The tubing assembly of claim 60 wherein
   (a) said polymeric tube further comprise antioxidant.

76. The tubing assembly of claim 75 wherein said antioxidant is selected from the group consisting of pentaerythritol tetrakis(3-(3,5-di-tert-butyl-4-hydroxyphenyl)propionate, thiodiethylene bis(3,5-di-tert-butyl-4-hydroxyphenyl)propionate), octadecyl-3-(3,5-di-tert-butyl- 4-hydroxyphenyl)-propionate, 6,6'-di-tert-butyl-2,2'-thiodi-p-cresol, N-N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-.$C_7$–$C_9$ branched alkyl esters, mixture of phenol, 2,4-dimethyl-6-(1-methylpentadecyl) and octdecyl-3-(3,5-di-tert-butyl-4-hydroxy-phenyl)-propionate, 3,3',3',5,5',5'-hexa-tert-butyl-a,a',a'-(mesitylene-2,4,6-triyl)tri-p-cresol, calcium diethyl bis(((3,5-bis(1,1-dimethylethyl)-4-hydroxyphenyl)methyl) phosphonate), 4,6-bis(octylthiomethyl)-o-cresol, hexamethylene bis(3-(3,5-di-tert-butyl-4-hydroxyphenyl)propionate), 2-(1,1-dimethyl)-6-(3-(1,1-dimethylethyl)-2-hydroxy-5-methylphenyl)methyl-4-methylphenyl acrylate, 1,3,5-tris(3,5-di-tert-butyl-4-hydroxybenzyl)-1,3,5-triazine-2,4,6(1H,3H,5H)-trione, (2,4,6-trioxo-1,3,5-triazine-1,3,5(2H,4H,6H)-triyl)triethylene tris(3-(3,5-di-tert-butyl-4-hydroxyphenyl)propionate), 2,2'-oxidobis(ethyl 3-(3,5-di-tert-butyl-4-hydroxyphenyl)propionate), mixture of 2-(1-methylpropyl)-4,6-dinitrophenol and N-(1,4-dimethylpentyl)-N'-phenyl-1,4-benzenediamine, 4-methyl-2,6-bis(2-phenylethenyl)phenol, bis((3,5-di-tert-butyl-4-hydroxyphenyl)propionyl-2-oxyethyl)sulfide, tris(2,4-di-tert-butylphenyl)phosphite, 2,2,4-trimethyl-1,2-dihydroquinoline polymer, tris(nonylphenyl)phosphite, 4-(1-methyl-1-phenylethyl)-N-(4-(1-methyl-1-phenylethyl) phenyl)-benzeneamine, tetrakis(3,5-di-tert-butyl-4-hydroxyhydrocinnamate)pentaerythritol, 2,6-di-tert-butyl-4-(octadecanoxycarbonylethyl)phenol, distearyl 3,3'-thiodipropionate, 2,6-di-tert-butyl-p-cresol, N-isopropyl-N'-phenyl-1,4-pheylenediamine, p-(p-tolylsulfonylamido) diphenylamine, N-phenyl-1-naphthylamine, 1,4-dihydroxy-2,5-di-tert-butyl benzene, diphenyl-p-phenylene diamine, bis(2,4-di-cumylphenyl)pentaerythritol diphosphite, tris(3,5-di-tert-butyl-4-hydroxybenzyl)isocyanurate, bis(2,4-di-tert-butylphenyl)pentaerythritol diphosphite, distearyl pentaerythritol diphosphite, 2,4,6-tri-tert-butylphenyl-2-butyl-2-ethyl-1,3-propanediol phosphate, and 2,2',2"-nitrilo (triethyl tris 3,3',5,5'-tetra-tert-butyl-1,1'biphenyl-2,2'-diyl) phosphite).

77. The tubing assembly of claim 60 which further comprises
(a) at least one second inner polymeric tube.
78. The tubing assembly of claim 77 wherein
(a) said polymeric tubes are coextruded.
79. A tubing assembly which comprises:
(a) at least two tubes, each tube having at least one tube end, each tube further comprising:
(i) an inner polymeric tube, an inner diameter of said inner polymeric tube defining an internal conduit, and
(ii) an outer metallic tube; and
(b) a connector for joining the at least two said tubes, the connector comprising
(i) a central portion with an internal conduit therein,
(ii) a plurality of arms, each arm extending from the central portion and terminating in an arm end, such that there is one arm and arm end paired with each said tube end, with the connector internal conduit extending through the arms to the respective arm end, and
(iii) each arm end having a longitudinally axially extending nipple portion emanating therefrom, each nipple having an external surface frictionally engaged in an internal surface of the inner polymeric tube internal conduit at the tube end, with the connector internal conduit extending through each nipple;

(iv) each nipple having a length sufficient to permit at least one compressive deformation of the respective tube end or arm end onto the nipple, joining the connector internal conduit to the tube internal conduit in a leak-free manner.

80. The tubing assembly of claim 79 wherein the permanently formed feature is selected from the group consisting of an angular diversion, an intersecting conduit, a smooth reduction of the internal and eternal diameters, and combinations thereof.
81. The tubing assembly of claim 79 wherein
(a) the connector is metallic.
82. The tubing assembly of claim 79 wherein
(a) the connector has two arms.
83. The tubing assembly of claim 79 wherein
(a) the connector has three arms.
84. The tubing assembly of claim 83 wherein
(a) the arms are arranged in a "T" shape.
85. The tubing assembly of claim 83 wherein
(a) the arms are arranged in a "Y" shape.
86. The tubing assembly of claim 79 wherein
(a) the connector has four arms.
87. The tubing assembly of claim 79 wherein
(a) the connector is a linear reducer.
88. The tubing assembly of claim 79 wherein
(a) the connector is a reducing elbow.
89. The tubing assembly of claim 79 wherein
(a) said nipple portions of said insert radially expand toward a middle of said connector.
90. The tubing assembly of claim 79 wherein
(a) an outer diameter of said inner polymeric tube and an inner diameter of said outer metallic tube are essentially equal, yet permit sliding insertion of said inner polymeric tube within said outer metallic tube.
91. The tubing assembly of claim 79 wherein
(a) said inner polymeric tube has a colorant incorporated therein.
92. The tubing assembly of claim 91 wherein
(a) said colorant is visible when expose to visible illumination.
93. The tubing assembly of claim 91 wherein
(a) said colorant is invisible when exposed to visible illumination, but visible under exposure to non-visible spectrum illumination.
94. The tubing assembly of claim 79 wherein
(a) said polymeric tube further comprises an antioxidant.
95. The tubing assembly of claim 94 wherein said antioxidant is selected from the group consisting of pentaerythritol tetrakis(3-(3,5-di-tert-butyl-4-hydroxyphenyl) propionate, thiodiethylene bis(3,5-di-tert-butyl-4-hydroxyphenyl)propionate), octadecyl-3-(3,5-di-tert-butyl-4-hydroxyphenyl)-propionate, 6,6'-di-tert-butyl-2,2'-thiodi-p-cresol, N-N'-hexane-1,6-diylbis(3-(3,5-di-tert-butyl-4-hydroxyphenylpropionamide)), benzenepropanoic acid, 3,5-bis(1,1-dimethyl-ethyl)-4-hydroxy-.$C_7$–$C_9$ branched alkyl esters, mixture of phenol, 2,4-dimethyl-6-(1-methylpentadecyl) and octdecyl-3-(3,5-di-tert-butyl-4-hydroxy-phenyl)-propionate, 3,3',3',5,5',5'-hexa-tert-butyl-a,a',a'-(mesitylene-2,4,6-triyl)tri-p-cresol, calcium diethyl bis(((3,5-bis(1,1-dimethylethyl)-4-hydroxyphenyl)methyl) phosphonate), 4,6-bis(octylthiomethyl)-o-cresol, hexamethylene bis(3-(3,5-di-tert-butyl-4-hydroxyphenyl)propionate), 2-(1,1-dimethyl)-6-(3-(1,1-dimethylethyl)-2-hydroxy-5-methylphenyl)methyl-4-methylphenyl acrylate, 1,3,5-tris(3,5-di-tert-butyl-4-hydroxybenzyl)-1,3,5-triazine-2,4,6(1H, 3H,5H)-trione, (2,4,6-trioxo-1,3,5-triazine-1,3,5(2H,4H, 6H)-triyl)triethylene tris(3-(3,5-di-tert-butyl-4-hydroxyphenyl)propionate), 2,2'-oxidobis(ethyl 3-(3,5-di-tert-butyl-4-hydroxyphenyl)propionate), mixture of 2-(1-methylpropyl)-4,6-dinitrophenol and N-(1,4-dimethylpentyl)-N'-phenyl-1,4-benzenediamine, 4-methyl-2,6-bis(2-phenylethenyl)phenol, bis((3,5-di-tert-butyl-4-hydroxyphenyl)propionyl-2-oxyethyl)sulfide, tris(2,4-di-tert-butylphenyl)phosphite, 2,2,4-trimethyl-1,2-dihydroquinoline polymer, tris(nonylphenyl)phosphite, 4-(1-methyl-1-phenylethyl)-N-(4-(1-methyl-1-phenylethyl) phenyl)-benzeneamine, tetrakis(3,5-di-tert-butyl-4-hydroxyhydrocinnamate)pentaerythritol, 2,6-di-tert-butyl-4-(octadecanoxycarbonylethyl)phenol, distearyl 3,3'-thiodipropionate, 2,6-di-tert-butyl-p-cresol, N-isopropyl-N'-phenyl-1,4-pheylenediamine, p-(p-tolylsulfonylamido) diphenylamine, N-phenyl-1-naphthylamine, 1,4-dihydroxy-2,5-di-tert-butyl benzene, diphenyl-p-phenylene diamine, bis(2,4-di-cumylphenyl)pentaerythritol diphosphite, tris(3, 5-di-tert-butyl-4-hydroxybenzyl)isocyanurate, bis(2,4-di-tert-butylphenyl)pentaerythritol diphosphite, distearyl pentaerythritol diphosphite, 2,4,6-tri-tert-butylphenyl-2-butyl-2-ethyl-1,3-propanediol phosphite, and 2,2',2"-nitrilo (triethyl tris 3,3',5,5'-tetra-tert-butyl-1,1'biphenyl-2,2'-diyl) phosphite).

96. The tubing assembly of claim 79 which further comprises (a) at least one second inner polymeric tube.

97. The tubing assembly of claim 96 wherein (a) said polymeric tubes are coextruded.

* * * * *

UNITED STATES PATENT AND TRADEMARK OFFICE
CERTIFICATE OF CORRECTION

PATENT NO.    : 6,783,160 B2
DATED         : August 31, 2004
INVENTOR(S)   : Rowley, William W.

It is certified that error appears in the above-identified patent and that said Letters Patent is hereby corrected as shown below:

Column 27,
Line 61, delete "fist" and substituting therefor -- least --.

Signed and Sealed this

Nineteenth Day of October, 2004

JON W. DUDAS
*Director of the United States Patent and Trademark Office*